R. B. LEE.
TIRE HOLDING DEVICE.
APPLICATION FILED JULY 17, 1919.
1,320,769.
Patented Nov. 4, 1919.
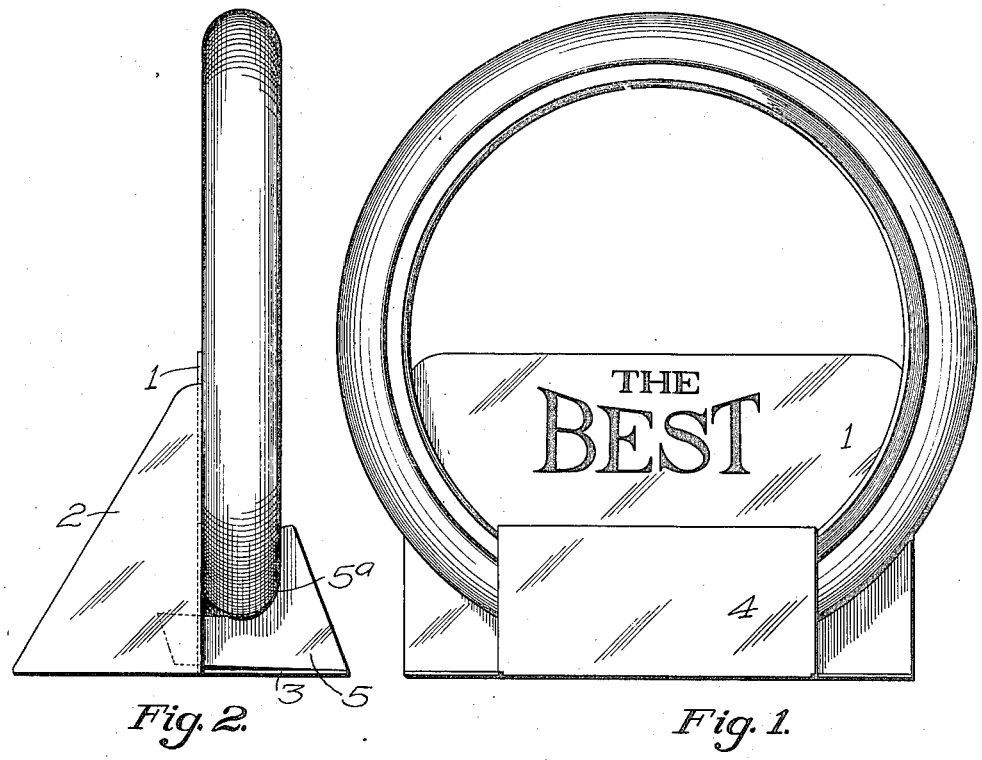
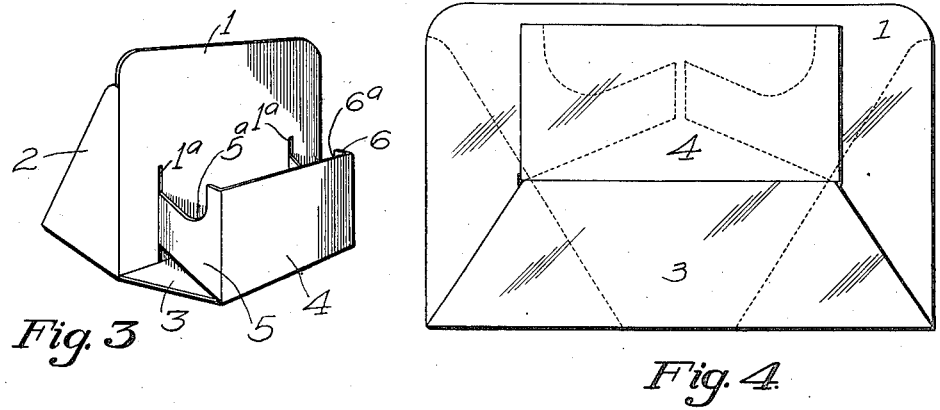
INVENTOR.
ROYAL B. LEE.
BY A. B. Bowman
ATTORNEY

UNITED STATES PATENT OFFICE.

ROYAL B. LEE, OF SAN DIEGO, CALIFORNIA.

TIRE-HOLDING DEVICE.

1,320,769.  Specification of Letters Patent.  Patented Nov. 4, 1919.

Application filed July 17, 1919. Serial No. 311,544.

*To all whom it may concern:*

Be it known that I, ROYAL B. LEE, a citizen of the United States, residing at San Diego, in the county of San Diego and State of California, have invented certain new and useful Improvements in Tire-Holding Devices, of which the following is a specification.

My invention relates to devices for supporting tires in an upright or nearly upright position for display purposes and the objects of my invention are: first, to provide a device adapted to be used for different sized tires for supporting them in an upright position for display purposes; second, to provide a device of this class in which the weight of the tire tends to clamp the device in engagement with the tire; third, to provide a device of this class with a large supporting easel of varying shapes adapted for advertising matter which shows inside of the tire or above the same when in position; fourth, to provide a device of this class which is collapsible and may be folded into a very compact form for shipping; fifth, to provide a novelly constructed tire holding device and sixth, to provide a device of this class which is very simple and economical of construction and durable.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my tire support with the tire positioned thereon; Fig. 2 is an end view thereof; Fig. 3 is a perspective view on a smaller scale of the device ready to receive the tire and Fig. 4 is a plan view of the device in its collapsed or folded form.

Similar characters of reference refer to similar parts and portions throughout the several views of the drawings.

The easel portion 1, supports 2, base portion 3, hinged side portion 4 and end flap portions 5 and 6 constitute the principal parts and portions of my tire holding device.

The easel portion 1 is preferably a large plate of any shape desired set in approximately vertical position and supported by means of foldable supports 2 which are adapted to fold back against said plate when in its collapsed form as shown in dotted lines in Fig. 4 of the drawings. Hinged to the plate 1 at the bottom edge is the base member 3 which extends normally in a horizontal position at a right angle to the member 1 and hinged to the outer portion 3 is a movable clamping portion 4 which is provided with hinged flaps 5 and 6, the lower portions of which are cut away on an angle and the top portions are provided with curved cutaway portions $5^a$ and $6^a$ adapted for the tire to rest in and the weight of the tire resting on the members 5 and 6 causes the member 4 to move inwardly against the tire and clamp it in position against the easel member 1, the extended ends of the members 5 and 6 being mounted in slots $1^a$ in the member 1 as shown best in Fig. 3 of the drawings. When it is desired to fold the device for shipping purposes the members 2 are folded back against the back side of the plate 1 as shown by dotted lines in Fig. 4, the member 4 is let down in alinement with the base member 3 and the members 5 and 6 fold against the inner surface of the member 4, then the members 5 and 6, and 3 and 4 are folded against the face side of the plate 1 all as shown by solid and dotted lines in Fig. 4 of the drawings.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction, there is provided a tire supporting device consisting of a large vertical support in the form of an easel on which advertising matter may be placed inside of the inner circumference of the tire when in position as shown best in Fig. 1 of the drawings, that with the members 5 and 6 positioned in the slots $1^a$ as shown in Fig. 3 the tire may be placed so that it rests in the cutaway portions $5^a$ and $6^a$ and the weight of the tire will carry the upper edge of the member 4 together with the members 5 and 6 inwardly clamping the tire against the easel member 1 and the easel member 1 is further supported by means of the supports 2 which extend backwardly from both ends of the portion 1; and that the device may be folded up in compact, flat form for shipping purposes.

Having thus described by invention what I claim as new and desire to secure by Letters Patent, is:

1. In a device of the class described, a supporting easel member, means for supporting it in approximately vertical position, a base member hinged thereto, a member hinged to said base member which extends upwardly from the side of said base member and two tire engaging flaps with their extended ends inserted in slots in said easel member whereby the tire is clamped against said easel member by reason of its weight in engagement with said flaps.

2. In a device of the class described, a supporting easel, a base member hinged thereto, a clamping member hinged to said base member and tire engaging flaps with their extended ends movable in slots in said easel member adapted to receive the tire and move said clamping member to clamp said tire.

In testimony whereof I have hereunto set my hand at San Diego, California, this 11th day of July, 1919.

ROYAL B. LEE.